United States Patent [19]

Oyanagi

[11] Patent Number: 5,148,045
[45] Date of Patent: Sep. 15, 1992

[54] APPARATUS AND METHOD FOR ASSIGNING A PLURALITY OF ELEMENTS TO A PLURALITY OF CELLS

[75] Inventor: Shigeru Oyanagi, Kanagawa, Japan

[73] Assignee: Kabushiki Kaisha Toshiba, Kanagawa, Japan

[21] Appl. No.: 656,682

[22] Filed: Feb. 19, 1991

[30] Foreign Application Priority Data

Feb. 27, 1990 [JP] Japan .................................. 2-044491

[51] Int. Cl.$^5$ .............................................. G06G 7/12
[52] U.S. Cl. ...................................... 307/201; 395/24
[58] Field of Search ................. 307/201; 364/513, 807; 395/24-25, 27

[56] References Cited

U.S. PATENT DOCUMENTS 4,874,963 10/1989 Alspector ............................. 307/201
5,040,134 8/1991 Park .................................. 307/201 X

OTHER PUBLICATIONS

Lee et al., "Design of a Neural-Based A/D Converter Using Modified Hopfield Network", *IEEE J.S.S.C.*, vol. 24, No. 4, Aug., 1989, pp. 1129-1135.
J. J. Hopfield and D. W. Tank, "'Neural' Computation of Decisions in Optimization Problems", *Biological Cybernetics*, vol. 52, 1985, pp. 141-152.

*Primary Examiner*—David Hudspeth
*Attorney, Agent, or Firm*—Finnegan, Henderson, Farabow, Garrett and Dunner

[57] ABSTRACT

A solution apparatus for solving an assignment problem interconnects the neurons, which correspond to the elements respectively, as the same number as the elements. The weight of connection between the neurons is set and the neurons are activated. The weight of connection is determined according to the connection status between the elements and the constraint of the assigned elements's number for the cell. When the output of the neurons converges, the convergence result is stored and the weight of connection is changed according to the convergence result. The convergence result corresponds to the answer for assigning the elements to two cells groups. The neurons are activated repeatedly whenever the weight of connection is changed. Therefore, the accumulated convergence result corresponds to the answer for assigning the elements to the cells respectively.

18 Claims, 7 Drawing Sheets

Fig.1A.
(PRIOR ART)

|   | A | B | C | D | E | F | G | H |
|---|---|---|---|---|---|---|---|---|
| 1 | 1 | 0 | 0 | 0 | 0 | 0 | 0 | 0 |
| 2 | 0 | 1 | 0 | 0 | 0 | 0 | 0 | 0 |
| 3 | 0 | 0 | 0 | 0 | 0 | 1 | 0 | 0 |
| 4 | 0 | 0 | 0 | 0 | 0 | 0 | 1 | 0 |
| 5 | 0 | 0 | 0 | 0 | 0 | 0 | 0 | 1 |
| 6 | 0 | 0 | 0 | 1 | 0 | 0 | 0 | 0 |
| 7 | 0 | 0 | 0 | 0 | 1 | 0 | 0 | 0 |
| 8 | 0 | 0 | 1 | 0 | 0 | 0 | 0 | 0 |

FIG. 7B FIG. 7C

APPARATUS AND METHOD FOR ASSIGNING A PLURALITY OF ELEMENTS TO A PLURALITY OF CELLS

BACKGROUND OF THE INVENTION

1. Field of the Invention

The present invention relates to a solution apparatus useful for solving the problem of how to properly assign plural elements to plural cells.

2. Description of the Background

An apparatus which effectively solves the combinatorial optimization problem is important in LSI design to determine element placement. For example, combinatorial optimization problem is that m elements are properly assigned to n cells. Recently, a solution for the combinatorial optimization problem by using a neural network has been proposed. The method which Hopfield proposed is representative. This method is disclosed in the following document.

"Hopfield and Tank;
"Biological Cybernetics, vol. 52"
PP 141-152, 1985"

LSI element placement by way of Hopfield's method is explained as follows. The placement problem for plural elements being placed on a circuit map is that each element is to be placed on a single one of a plurality of cells in such a way as to minimize the virtual path length between elements. In this case, dij: distance between cell i and cell j
Rxy: path between element x and element y
CAPi: the number of elements being placed on cell i
Vxi: output of neuron
[VXi=1] element x is placed on cell i
Vxi=0] element x is not placed on cell i The energy function E of a neural network for solving the LSI element placement problem is as follows.

$$E = \frac{A}{2} \sum_x \sum_i Vxi(1 - Vxi) + \frac{B}{2} \sum_x \left( \sum_i Vxi - 1 \right)^2 +$$

$$\frac{C}{2} \sum_i \left( \sum_x Vxi - CAPi \right)^2 + \frac{D}{2} \sum_x \sum_i \sum_y \sum_j Rxy\, dij\, Vxi\, Vyi$$

The first term of the right side of the equation is the constraint for each neuron to generate "1" or "0" as the output Vxi. The second term of the right side of the equation is the constraint for each element to be placed on one cell respectively. The third term of the right side of the equation represents the capacity for each cell to contact multiple elements. And the fourth term of the right side of the equation is the evaluation function used to minimize the virtual path length between elements. By solving the energy function, the optimum solution for LSI element placement problem is obtained.

Figure 1A:
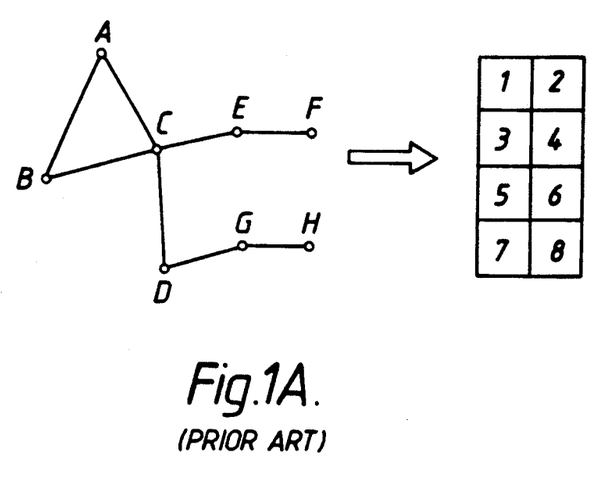
FIG. 1A shows plural elements and cells for the assignment problem.
Figure 1B:
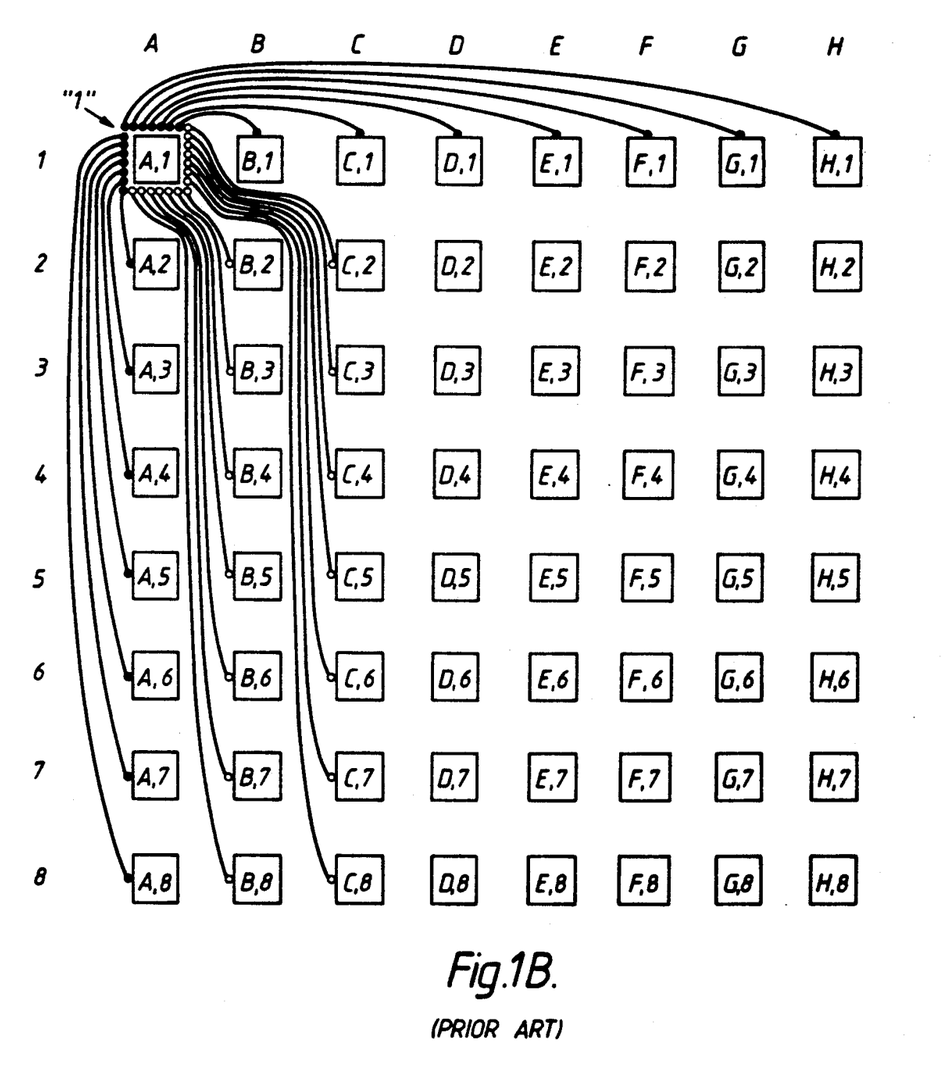
FIG. 1B shows a neural network for solving the assignment problem according to the prior art.

FIG. 1A shows plural elements, A-H, being drawn on the circuit chart and plural cells, 1-8, being arranged, for example, on the substrate. FIG. 1B shows a neural network according to the elements and cells as shown in FIG. 1A. In FIG. 1B, sixty four squares, (A,1)-(H,8), represent neurons and the white/black circle on the neuron represents the weight of connection. The white circle is a positive weight of connection and the black circle is a negative weight of connection. In short, because the number of elements is eight (A-H), and the number of cells is eight (1-8), the number of neuron is sixty-four (=8×8). In FIG. 1B, the eight labels (A-H) in the horizontal row correspond to eight elements and the eight labels (1-8 in the vertical column correspond to eight cells, respectively.

In setting the weights of connection for the sixty four neurons, first the negative weights of connection are set between neurons, arranged in the vertical column. These negative weights of connection correspond to the second term of the right side of the equation for the above-mentioned energy function, and are represented by a black circle in the vertical column. In FIG. 1B, only black circles which come from the neuron (A, 1), are drawn, although in reality such black circles are also on the outer neurons.

Secondly, the negative weights of connection are set between neurons arranged in the horizontal row. These negative weights of connection correspond to the third term of the right side of the equation for the above-mentioned energy function, and are represented by a black circle in the horizontal row. In FIG. 1B, only the black circles which come from the neuron (A, 1 are drawn.)

Thirdly, positive weights of connection are set between neurons in accordance with connection status of elements, as shown in FIG. 1A. For example, element A is connected with element B and element C. Therefore, a positive weight of connection is set between element A and element B, element A and element C. (In FIG. 1B, white circles from neuron (A, 1) only are drawn.) If element A is placed at cell 1 and element B is placed at cell 2, or cell 3, or cell 4, the positive weight of connection between element A and element B is strong because its distance is short. On the other hand, if element B is placed at cell 5, or cell 6, or cell 7, or cell 8, the positive weight of connection between element A and element B is weak because its distance is long. Therefore, the values of the white circles between neuron (A, 1), and neuron (B, 2) (B, 3) (B, 4) (C, 2) (C, 3) (C, 4) are high. The values of the white circles between neuron (A, 1) and neuron (B, 5) (B, 6) (B, 7) (B, 8) (C, 5) (C, 6) (C, 7) (C, 8) are low. These positive weights of connection correspond to the fourth term of the right side of the equation for the above-mentioned energy function.

Figure 1C:
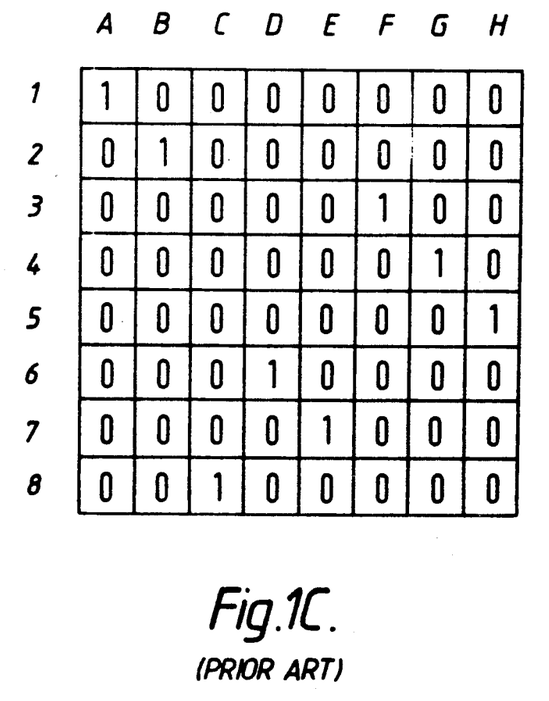
FIG. 1C shows the output for neurons to be in a stable state.

Lastly, external input "1" is assigned for neuron (A, 1), because element A is desired to be fixed at cell 1 according to a design constraint. It is represented as an arrow in FIG. 1B. Then, from the external input "1" as the beginning, the signal is transmitted between neutrons in order. And when the neural network enters a stable state (the output of each neuron is unchangeable), the output of each neuron corresponds to an answer for the LSI element placement problem. FIG. 1C shows the output when the neurons are in a stable state. The neuron number which generates signal "1", corresponds to the answer, which a representation of the combination of the element and the cell where it is to be placed.

However, the above-mentioned method is defective for packaging purposes because the number of neurons equals the product of the number of elements and the number of cells. And the number of weights of connection equals a square of the number of neurons. In short, it is necessary for the neural network to equip a great many neurons and weights of connections. Therefore, packaging the neural network is not practical because of cost.

SUMMARY OF THE INVENTION

Accordingly, it is one object of the present invention to provide a solution apparatus for an assignment problem wherein packaging the neutral network is practical in terms of cost.

It is another object of the present invention to provide a solution apparatus for an assignment problem in which it is not necessary for a neural network to equip a great many neurons and weights of connections.

These and other objects of the present invention are accomplished by interconnecting a plurality of neurons, which correspond in number to the elements. The weight of connection between the neurons is set and the neurons are activated by entering as an input for each neuron a weighted sum of the other neurons' output and a corresponding weight of connection between the neurons, and to generate the output from each neuron. When output of the neurons converges, the convergence result is stored. And the weights of connection are changed according to the convergence result. Then the neutrons are reactivated whenever the weights of connection are changed. The weights of connection are determined by an energy function, which is related to an evaluation of the connection status between elements and the constraint of the number of assigned elements for each cell.

Therefore, the accumulated convergence result corresponds to the answer for properly assigning plural elements to plural cells.

DESCRIPTION OF THE PREFERRED EMBODIMENTS

Figure 2:
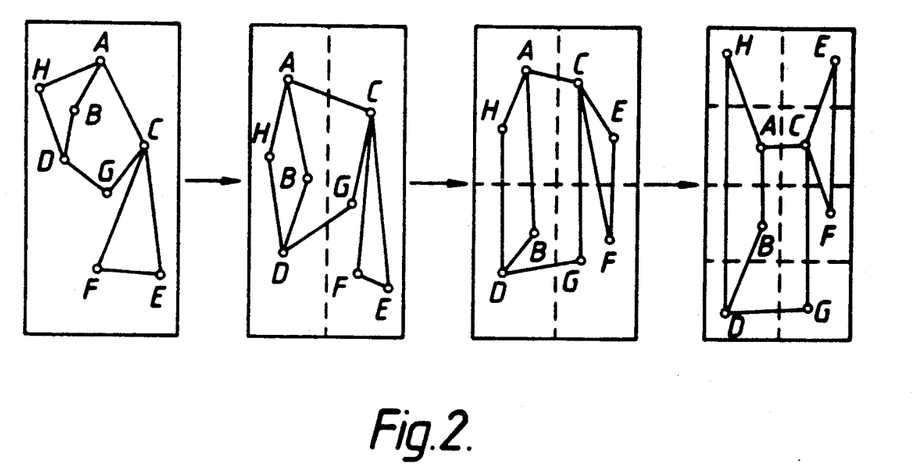
FIG. 2 shows division processing for elements of the present invention.

The present invention is an apparatus and a method for solving the assignment problem, which relates to how to efficiently assign n elements to m cells. The present invention is accomplished by constructing a neural network which interconnects n neuron corresponding to n elements respectively. By activating the neural network repeatedly, a division processing for the elements is repeated. In short, n elements are divided into two groups by activating the neural network, and both of the two divided groups are divided into two by reactivating the neutral network. By repeating such two division processing, n elements are divided into m (=the power of two) and m divided elements corresponds to m cells respectively. Concretely as shown in FIG. 2, eight elements (A, B, C, D, E, F, G, H), whose placements are not determined at first, are divided into $2^3(=8)$ by repeating three times the division by two and each divided element is assigned to each cell, respectively.

Such two division of elements is processed until the number of assigned elements for each divided area is equivalent, and the number of crossings of the connection lines between elements and the boundary of the divided area is minimized.

Sx; area of element x

Txy; number of connections between element X and element Y

Ux; number of external connections between element X and cell's top edge

Dx; number of external connections between element X and cell's bottom edge

Lx; number of external connections between element X and cell's left edge

Rx; number of external connections between element X and cell's right edge

[1], [−1]; output value of neuron corresponding to an element

According to their output value, plural elements are divided into one group of cells whose corresponding neurons generate an output of [1] and another group of cells whose corresponding neurons generate an output of [−1]. The energy function E of the neural network for the two division processing is represented as follows.

$$E = \frac{K}{2} \sum_x \sum_y Txy(1 - VxVy) + J\left(\sum_x SxVx\right)^2 + \frac{K}{2} \sum_x [Ux(1 - Vx) + Dx(1 + Vx)] \quad (1)$$

(J, K; positive constant)

The first term of the right side of the energy function E operates to minimize the number of interconnections between the two divided groups. If element X and element Y belong to the same group, the first term is [0]. If element X and element Y belong to different groups, the first term is [Txy].

The second term of the right side of the energy function E operates to equalize the area of the two groups. In short, the two groups are assigned the same number of elements respectively. The second term is a square of the difference of the area between two groups.

The third term of the right side of the energy function E operates to minimize the number of edge connections. Specially, the third term functions to divide each of the two groups of cells into top and bottom groups. If the output of a neuron is [1], the corresponding element is assigned to the top group. If the output of neuron is [−1], the corresponding element is assigned to the bottom group. When the elements are divided into two left groups of cells and two right group of cells, the third term is represented as follows.

$$\frac{K}{2} \sum_x [Lx(1 - Vx) + Rx(1 + Vx)]$$

If the output of a neuron is [1], the corresponding element is assigned to the left cell group. If the output of neuron is [−1], the corresponding element is assigned to the right cell group. The energy function E is applied in constructing a neural network. Hopfield's energy formula is represented as follows.

$$E = -\frac{1}{2} \sum_x \sum_y Wxy\, VxVy - \sum_x IxVx$$

Wxy; weight of connection between elements
Ix; external input for element

Accordingly, comparing the transformed energy function E and Hopfield's energy formula, the weights of connection and the external input are represented as follows.

$$Wxy = KTxy - 2JSxSy$$

$$Ix = \frac{K}{2}(Ux - Dx) \text{ or } \frac{K}{2}(Lx - Rx)$$

The neural network is constructed by setting the weight of connection Wxy and the external input Ix.

When two divided cells groups are divided into two respectively, it is necessary to consider the condition of the placement side. For example, as shown in FIG. 2, the divided group (A, B, D, H) is divided into two groups (A, H) (B, D). And the divided group (C, E, F, G) is divided into two groups (C, E) (F, G). At this place, connected elements (A–C) are placed at the top cell and connected elements (D–G) are placed at the bottom cell. In short, when each of the two groups are divided into two respectively, the connected elements had better be placed at the same side of a cell. In other words, the number of crossings of the cell boundary and the number of connection lines between elements must minimized. If the number of crossings is included in the energy function E, the energy function F is represented as follows.

$$F = \frac{K}{2}\left[ \sum_{xA}\sum_{yA} Txy(1 - VxVx) + \right. \tag{2}$$

$$\sum_{xB}\sum_{yB} Txy(1 - VxVy) +$$

$$\frac{K}{2}\left[ \sum_{xA}\sum_{yB} Txy(1 - VxVy) \right] +$$

$$J\left[ \left(\sum_{xA} SxVx\right)^2 + \left(\sum_{xB} SxVx\right)^2 \right] +$$

$$\left. \frac{K}{2} \sum_x [Lx(1 - Vx) + Rx(1 + Vx)] \right]$$

The weight of connection Wxy and the external input Ix are calculated by the energy function F. Then by setting Wxy, Ix and activating the neural network, the divided two groups are divided into two. In the same way, the divided four groups are divided into two respectively. Finally by repeating n times the division by two processing, the elements are divided into $2^n$ groups. In short, the elements are assigned at $2^n$ cells respectively.

Figure 3:
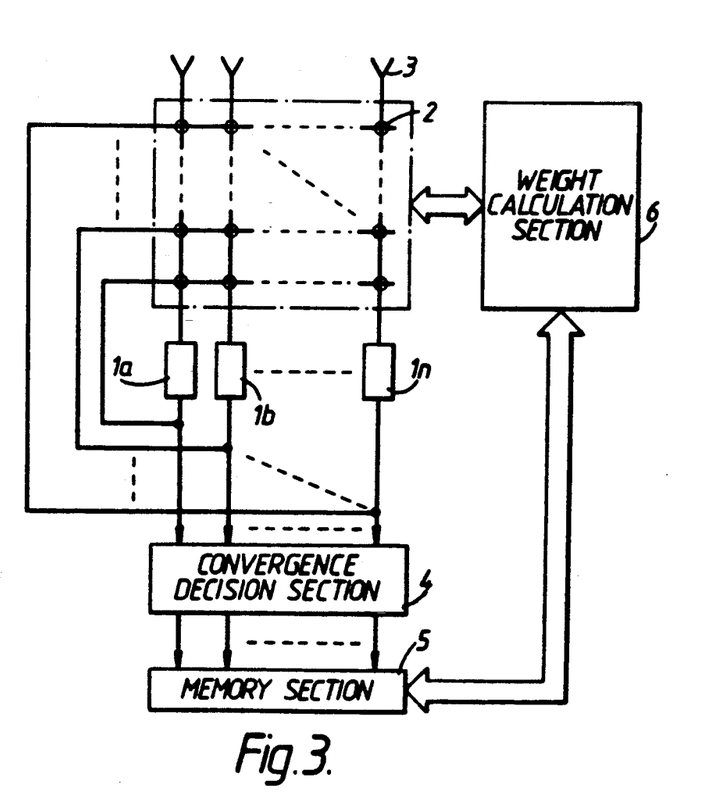
FIG. 3 shows a schematic of a solution apparatus for an assignment problem of the present invention.

FIG. 3 shows a schematic of a solution apparatus for an assignment problem according to the present invention. The neural network is constructed by interconnecting n neurons 1a, 1b–1n through the weight of connection section 2. The neurons 1a, 1b–1n correspond to n elements respectively. The weight of connection section 2 multiplies the output of neurons 1a, 1b–1n by the corresponding weight of connection Wij and supplies the neurons 1a, 1b–1n, with the corresponding weighted value. The neurons 1a, 1b–1n calculate the weighted sum for receiving the weighted value. In comparison with the weighted sum and the external input Ix through the external input terminal 3, the neurons 1a, 1b–1n calculate the output value.

The calculation of the neurons 1a, 1b–1n is repeated until the output of all neurons converge. The convergence occurs when the output of the neuron is fixed as [1] or [−1] as a stable state value. The convergence decision section 4 determines whether the output of the neurons 1a, 1b–1n converge or not. When the convergence decision section 4 detects that the outputs converge, the output values of the neurons 1a, 1b–1n are stored in the memory section 5. Convergence is detected when half of the output values are [1] and the other half of the output values are [−1]. The element corresponding to the neuron is assigned to either of two cell groups according to the neuron's output value. Whenever the outputs of the neurons converge, the neural network is reactivated according to the convergence result. At this time, the weight calculation section 6 sets new weight of connection for the weight of connection section 2 according to the convergence result stored in the memory section 5. Then the weight calculation section 6 reactivates the neural network.

Figure 4:
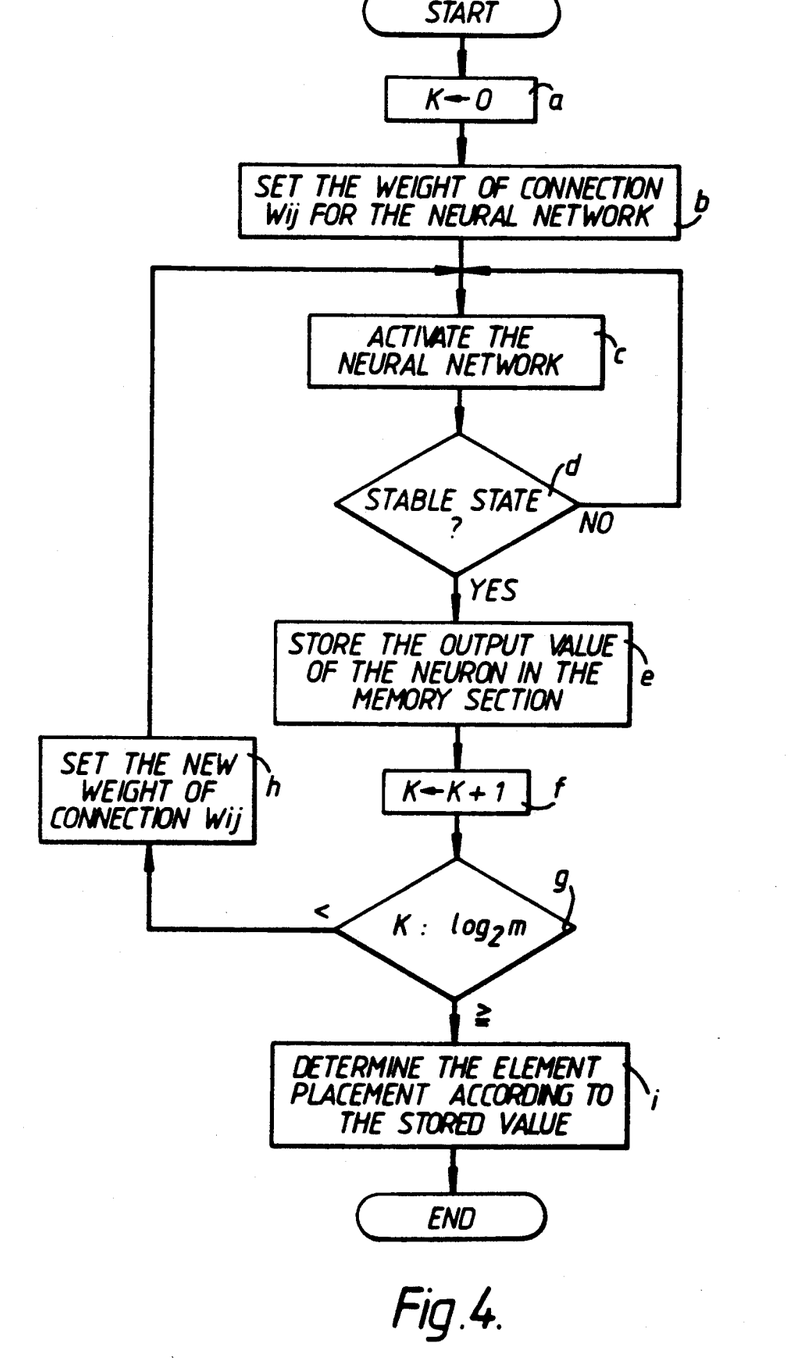
FIG. 4 shows a flow chart of the process for solving an assignment problem according to the present invention.

FIG. 4 shows a flow chart of the division process for the elements by using the neural network. Firstly, the control parameter K for repeating the division process is initialized [0] (step a). The weights of connection Wij are set for the neural network (the weight of connection section 2) according to the energy function (step b). The neural network is then activated (step c).

The convergence division section 4 determines whether the outputs of the neurons 1a, 1b–1n converge or not (step d). The processing of the neural network is continued until the outputs of the neurons converge. When the convergence decision section 4 detects that the outputs have converged, the output value of the neurons 1a, 1b–1n is stored in the memory section 5 and the two division processing is finished (step e). Next, the control parameter k is increased by 1 (step f). The weight calculation section 6 judges whether the increased parameter k reaches $\log_2 m$ or not (step g). $\log_2 m$ is the number of repetition times for the division (m: the number of cells). If the parameter K has not reached $\log_2 m$, the new energy function is calculated for repeating the division. The new weights of connection Wij for the new energy function are set for the neural network (step h). The neural network is reactivated under the new weights of connection (step c). In these ways, plural elements are divided into two in order. Therefore, the elements are divided into two, four, eight, ... m. If the parameter k reaches $\log_2 m$ (step g), the two division processing is finished completely (step g). According to the two division information stored in the memory section 5, the element is assigned to the corresponding cell (step i).

Figure 5A:
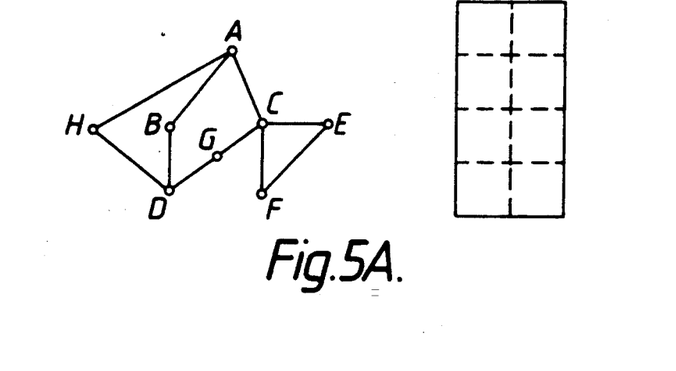
FIG. 5A shows elements and the cells of the problem.
Figure 5B:
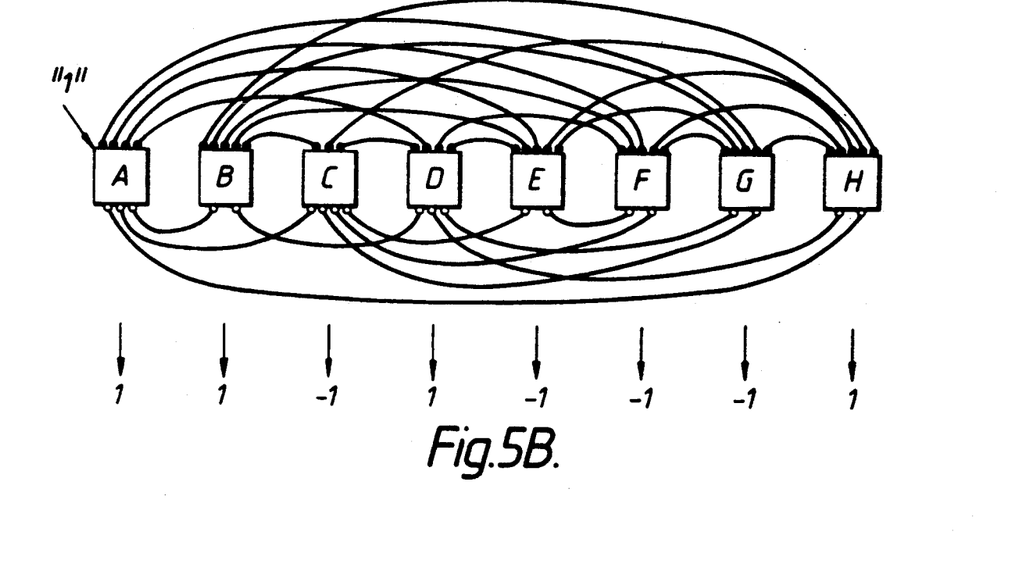
FIG. 5B shows the neural network for two division processing according to the present invention.

Next, by using a specific example, the two division processing of the present invention is explained in detail. FIG. 5A shows eight elements and eight cells. The problem is that the elements are to be assigned to the cells respectively, minimizing the number of crossings of the connection lines between elements and the boundary between the cells. FIG. 5B shows the neural network being constructed according to the interconnected elements in FIG. 5A. The neurons (A, B, C, D, E, F, G, H) in FIG. 5B correspond to the element (A, B, C, D, E, F, G, H) in FIG. 5A respectively. The positive weights of connection (white circle in FIG. 5B) are set between the neurons according to the connection status of the elements in FIG. 5A. The positive weights of connection corresponds to the first term of the right side of the energy function E (above mentioned formula (1)). The negative weights of connection (black circle in FIG. 5B) are set between the neurons which the positive weights of connection are not set. The negative weights of connection correspond to the second term of the right side of the energy function E.

Figure 5C:
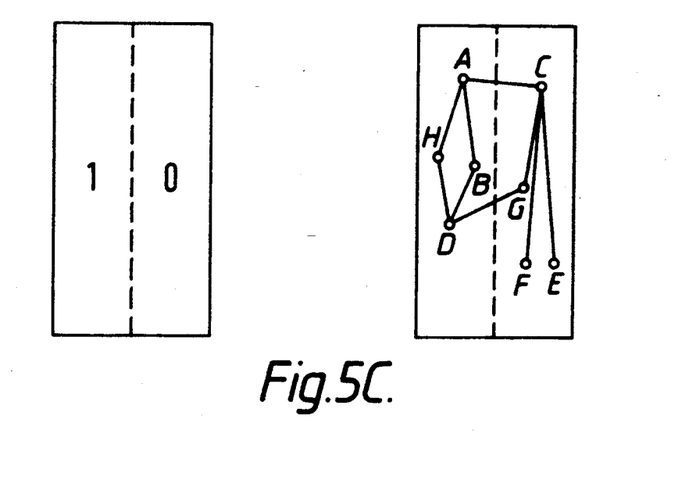
FIG. 5C shows the assigned elements to the cells according to the two division result.

The external input "1" is supplied for the neuron A because the element A is desired to be placed at the cell group 1 (as shown in left side of FIG. 5c) according to the design constraint. The external input corresponds to the third term of the right side of the energy function E. Then, after the input signal is transmitted between the neurons according to the weights of connection, the neural network converges. The convergence output value for each neuron is shown in bottom of FIG. 5B. If the output value is "1", the corresponding element is placed at the cell group 1. If the output value is "−1", the corresponding element is placed at the cell group 0. In these ways, the elements are divided into two as shown in right side of FIG. 5C.

Figure 6A:
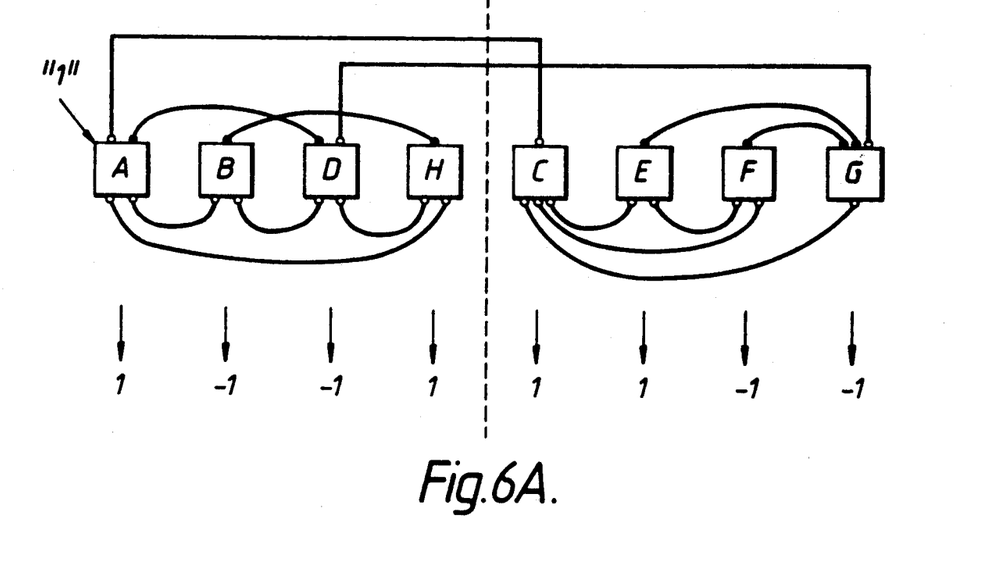
FIG. 6A shows the neural network for four division processing according to the present invention.
Figure 6B:
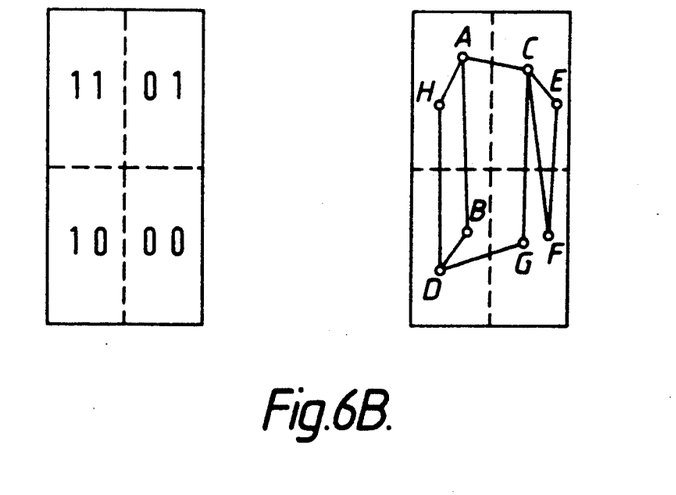
FIG. 6B shows the assigned elements to the cells according to the four division result.

FIG. 6A shows the neural network being constructed according to the two division result. The positive weights of connection (white circle connected by the curve line in FIG. 6A) are set for the neurons (A, B, D, H) according to the connection status between elements (A, B, D, H) in the cell group 1. In the same way, the positive weights of connection are set for the neurons (C, E, F, G) according to the connection status between elements (C, E, F, G) in the cell group 0. The positive weights of connection correspond to the first and second term of the right side of the energy function F (above mentioned formula (2)). The negative weights of connection (black circle in FIG. 6A) are set between the neurons (A, B, D, H) for which the positive weights of connection are not set. In the same way, the negative weights of connection are set between the neurons (C, E, F, G) for which the positive weights of connection are not set. The negative weights of connection correspond to the fourth term of the right side of the energy function F. Another positive weight of connection (white circle connected by the straight line in FIG. 6A) is set between the neurons (A, C) because the elements (A, C) are interconnected between the cell group 1 and the cell group 0 (as shown in right side of FIG. 5C). In the same way, another positive weight of connection is set between the neurons (D, G). The another positive weight of connection corresponds to the third term of the right side of the energy function F. And the external input "1" is supplied for the neuron A because the element A is desired to be placed at the cell group 11 (as shown in left side of FIG. 6B) according to the design constraint. Then, after the input signal is transmitted between the neurons according the weights of connection, the neural network converges. The convergence output value of each neuron is shown in bottom of FIG. 6A. If the output value is "1" and the previous output value (as shown in FIG. 5B) is "1", the corresponding element is placed at the cell group 11 (as shown in left side of FIG. 6B). If the output value is "1" and the previous output value is "−1", the corresponding element is placed at the cell group 10. If the output value is "−1" and the previous output value is "1", the corresponding element is placed at the cell group 01. If the output value is "−1" and the previous output value is "−1", the corresponding element is placed at the cell group 00. In these ways, the elements are divided into four groups as shown in right side of FIG. 6B.

Figure 7A:
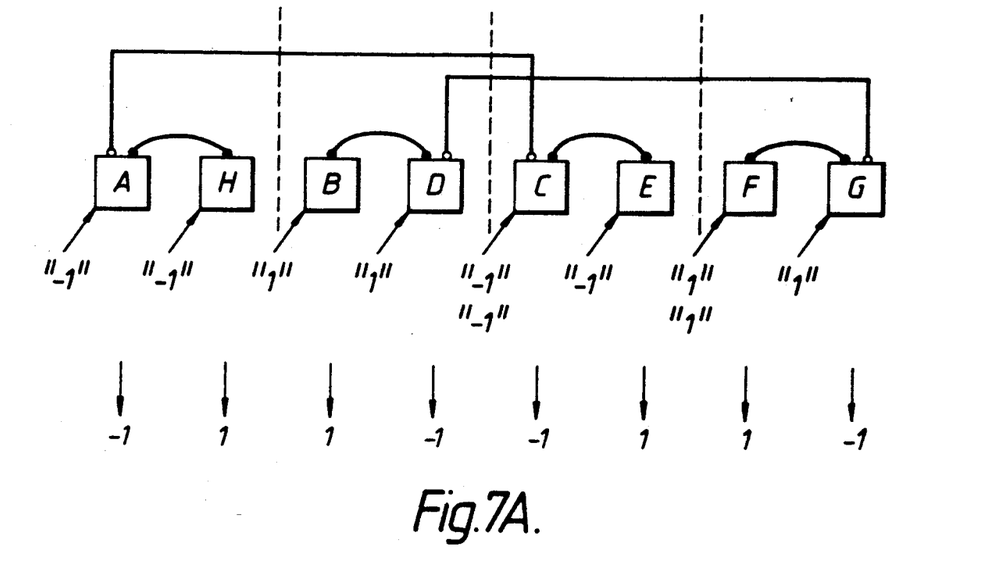
FIG. 7A shows the neural network for eight division processing according to the present invention.
Figure 7B:
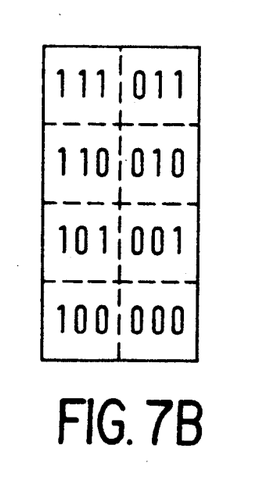
FIG. 7B shows the assigned elements to the cells according to the eight division result.
Figure 7C:
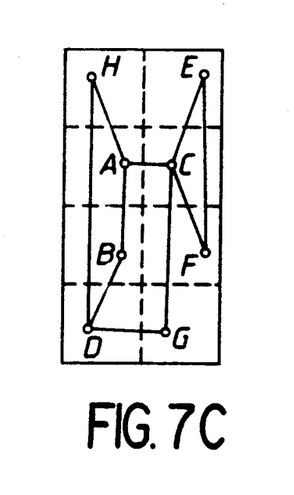
FIG. 7C shows the assigned elements to the cells according to the eight division result.

FIG. 7A shows the neural network being constructed according to the four division result. The negative weights of connection (black circle in FIG. 7A) are set between the neurons (A, H) because the elements (A, H) are desired to be placed at two different cell in the cells group 11 respectively. In the same way, the negative weights of connection are set between the neurons (B, D), (C, E), (F, G). A positive weight of connection is set between the neurons (A, C) because the elements (A, C) are interconnected between the cell group 11 and the cell group 01. In a same way, the positive weight of connection is set between the neurons (D, G). Next, the external input for the neuron is determined. The element A and the element B are interconnected as shown in right side of FIG. 6B. Because of minimizing the number of crossings of the connection line between the element (A, B) and the boundary between the cells, the element A is desired to be placed at the cell 110 and the element B is desired to be placed at the cell 101 (as shown in FIG. 7B). Therefore, the external input "−1" (the slant arrow in FIG. 7A) is supplied for the neuron A and the external input "1" is supplied for the neuron B. In short, "1" or ¢−1" corresponding to the third digit of the desired cell's number is selected as the external input value. In the same way, the element H is desired to be placed at the cell 110 and the element D is desired to be placed at the cell 101 because of interconnecting the elements (H, D). Therefore, the external input "−1" is supplied for the neuron H and the external input "1" is supplied for the neuron D. The element C is desired to be placed at the cell 010 and the element G is desired to be placed at the cell 001 because of interconnecting the elements (C, G). Therefore, the external input "−1" is supplied for the neuron C and the external input "1" is supplied for the range G. The element E is desired to be placed at the cell 010 and the element F is desired to be placed at the cell 001 because of interconnecting the element (E, F). Therefore, the external input "−1" is supplied for the neuron E and the external input "1" is supplied for the neuron F. The element C is desired to be placed at the cell 010 and the element F is desired to be placed at the cell 001 again because of interconnecting the elements (C, F). Therefore, the external input "−1" is supplied for the neuron C and the external input "1" is supplied for the neuron F once more. Then after the input signal is transmitted between the neurons according to the weights of connection, the neural network converges. The convergence output value for each neuron is shown in bottom of FIG. 7A. If the output value is "1", the previous output value of the four division (as shown in FIG. 6A) is "1" and the previous output value of the two division (as shown in FIG. 5B) is "1", the corresponding element is placed at the cell 111 (as shown in FIG. 7C). If the output value is "−1", the previous output value of the four division is "1" and the previous output value of the two division is "1", the corresponding element is placed at the cell 110. If the output value is "1", the previous output value of the four division is "−1" and the previous output value of the two division is "1", the corresponding element is placed at the cell 101. If the output value is "−1", the previous output value of the four division is "−1" and the previous output value of the two division is "1", the corresponding element is placed at the cell 100. If the output value is "1", the previous output value of the four division is "1" and the previous output value of the two division is "−1", the corresponding element is placed at the cell 011. If the output value is "−1", the previous output value of the four division is "1" and the previous output value of the two division is "−1", the corresponding element is placed at the cell 010. If the output value is "1", the previous output value of the four division is "−1", and the previous output value of the two division is "−1", the corresponding element is placed at the cell 001. If the output value is "−1", the previous output value of the four division is "−1" and the previous output value of the two division is "−1", the corresponding element is placed at the cell 000. In this way, the elements are divided into eight and assigned to the cells respectively, as shown in FIG. 7C.

As described above, by using a neural network in which the number of neurons is the same as the number of elements, the assignment problem is solved properly. In short, by repeating division into two for the elements, the elements are properly assigned to the corresponding cells. Therefore, according to the present invention, packaging the neural network is practical in terms of cost.

What is claimed is:

1. An apparatus for assigning plural elements to plural cells, comprising:
    a plurality of neurons corresponding in number to the elements, wherein the neurons generate an output signal by operating on an input signal;
    network interconnecting means for interconnecting said plurality of neurons;
    activating means for setting a weight of connection between the neurons interconnected by the network interconnecting means, for activating the network interconnecting means for each neuron by providing as an input signal for each neuron a sum of the product of each of the output signals of the neurons and a corresponding weight of connection between the neurons, and for generating the output signal from each neuron, wherein the output signals from said plurality of neurons are used to identify the cells to which the corresponding elements are to be assigned;
    changing means for changing the weights of connection between the neurons when the output signals of the neurons converge; and
    reactivating means for reactivating the network interconnecting means whenever the weights of connection between the neurons are changed.

2. The apparatus according to claim 1 further including calculating means, included in said activating means and said changing means, for calculating the weights of connection between the neurons by calculating an energy function which involves an evaluation of the connection status between the elements and the constraint of the number of assigned elements for each cell.

3. The apparatus according to claim 2, wherein said changing means determines that the output signals of the neurons have converged when the output signals of half of the neurons are "1" and the output signals of the other half of the neurons are "−1".

4. The apparatus according to claim 3, wherein said reactivating means assigns the elements corresponding to the neurons which generate the same output signals to a common group of cells.

5. The apparatus according to claim 4, wherein said changing means changes the weights of connection between the neurons so that each group of cells has an equal number of elements assigned thereto.

6. The apparatus according to claim 5, wherein upon reactivation by said reactivating means, said changing means determines that the output signals of the neurons converge when the output signals of half of the neurons assigned to a group of cells are "1" and the output signals of the other half of the neurons assigned to the group of cells are "−1".

7. The apparatus according to claim 6, wherein said reactivating means assigns the elements corresponding to the neurons which generate the same output signals to a common subgroup of cells within the group of cells to which the elements had previously been assigned.

8. The apparatus according to claim 7, wherein said changing means supplies external input signals to each of the neurons in accordance with the connection status between the elements assigned to different groups of cells, respectively.

9. The apparatus according to claim 8, wherein said reactivating means reactivates the network interconnecting means such that the network interconnecting means is activated and reactivated a total of $\log_2 m$ times, wherein m represents the total number of cells.

10. A method of solving an assignment problem, wherein plural elements are assigned to plural cells, comprising the steps of:
    interconnecting a plurality of neurons corresponding in number to the elements, wherein the neurons generate an output signal by operating on an input signal;
    setting weights of connection between the neurons interconnected at the interconnecting step;
    activating the neurons by entering as an input signal for each neuron a weighted sum of the product of each of the output signals of the neurons and a corresponding weight of connection between the neurons, and generating an output signal;
    assigning the elements to the cells or a group of cells based upon the output signals of the corresponding neurons when the output signals of the neurons converge;
    changing the weights of connection when the output signals of the neurons converge; and
    reactivating the neurons whenever the weights of connection between the neurons are changed.

11. The method of solving an assignment problem according to claim 10, wherein the setting step includes the sub-step of: calculating an energy function, which involves an evaluation of the connection status between the elements and the constraint of the number of assigned elements for each cell.

12. The method of solving an assignment problem according to claim 11, further including the step of:
considering the output signals of the neurons as being converged when the output signals of half of the neurons are "1" and the output signals of the other half of the neurons are "−1".

13. The method of solving an assignment problem according to claim 11, wherein the assigning step includes the sub-step of:
assigning the elements corresponding to the neurons which generate the same output signal to a common group of cells.

14. The method of solving an assignment problem according to claim 12, wherein the changing step includes the sub-step of:
changing the weights of connection so that each group of cells has an equal number of elements assigned thereto.

15. A method of solving an assignment problem according to claim 14, further including the step of:
considering the output signals of the neurons as being converged when the output signals of half of the neurons are "1" and the output signals of other half of the neurons are "−1".

16. The method of solving an assignment problem according to claim 15, wherein the assigning step further includes the sub-step of:
assigning the elements corresponding to the neurons which generate the same output signals in a common subgroup of cells within the group of cells to which the elements had previously been assigned.

17. The method of solving an assignment problem according to claim 16, wherein the reactivating step includes the sub-step of:
supplying the external input signals to each of the neurons in accordance with the connection status between the elements assigned to different groups of cells, respectively.

18. The method of solving an assignment problem according to claim 17, further comprising the step of stoping the reactivating of the neurons after the neurons have been activated and reactivated a total of $\log_2 m$ times, wherein m represents the total number of cells.

* * * * *